United States Patent [19]
Handle

[11] 4,005,855
[45] Feb. 1, 1977

[54] KNEADING DEVICE FOR CLAY AND SIMILAR MATERIALS

[75] Inventor: Frank Handle, Muhlacker, Germany

[73] Assignee: Karl Handle & Sohne, Maschinenfabrik und Eisengiesserei, Muhlacker, Germany

[22] Filed: Sept. 11, 1974

[21] Appl. No.: 505,156

[30] Foreign Application Priority Data

Sept. 13, 1973 Germany .......................... 2346159

[52] U.S. Cl. .............................................. 259/185
[51] Int. Cl.² ...................... A21C 1/04; B29B 1/04
[58] Field of Search ...... 259/185, DIG. 1, DIG. 11, 259/106, 107, 109, 102, DIG. 32, DIG. 34, 40, 41, 42, 45, 46

[56] References Cited

UNITED STATES PATENTS

| | | | |
|---|---|---|---|
| 221,364 | 11/1879 | Ruger | 259/45 |
| 509,987 | 12/1893 | Wilcox | 259/46 |
| 1,750,710 | 3/1930 | Fain | 259/109 |
| 1,909,324 | 5/1933 | Wendler | 259/109 |
| 2,099,937 | 11/1937 | Lauterbur | 259/DIG. 1 |
| 2,994,100 | 8/1961 | Comes et al. | 259/41 |

FOREIGN PATENTS OR APPLICATIONS

| | | | |
|---|---|---|---|
| 227,135 | 9/1962 | Austria | 259/46 |
| 569,946 | 4/1924 | France | 259/45 |
| 172,211 | 6/1906 | Germany | 259/45 |
| 613,044 | 11/1960 | Italy | 259/41 |

*Primary Examiner*—Leonard D. Christian
*Assistant Examiner*—Donald B. Massenberg
*Attorney, Agent, or Firm*—Walter Becker

[57] ABSTRACT

A kneading device for clay and similar materials in which a frame has a horizontal shaft rotatable therein with at least one radially offset kneading member. The frame includes an upwardly concave reaction member concentric with the shaft. The reaction member has a circumferential portion which is perforated and which can be replaced by another such member having different perforations therein. The circumferential portions, or shells, are supported in the frame by respective curved rocker elements disposed therebeneath.

19 Claims, 11 Drawing Figures

KNEADING DEVICE FOR CLAY AND SIMILAR MATERIALS

The present invention relates to a kneading device for clay and clay-like masses with a tank or vat provided on a frame. In the vat there is rotatably journaled at least one kneading tool which is rotatable about a horizontal axis while a kneading member arranged in spaced relationship to said axis of rotation moves above the bottom of the tank which is curved about said axis of rotation.

It is an object of the present invention to provide a kneading device of the above mentioned type which will be simple in construction and will be rugged.

These objects and other objects and advantages of the invention will appear more clearly from the following specification in connection with the accompanying drawings, in which.

The kneading device according to the present invention which is provided with a vat on a frame in which vat a kneading rotor is rotatably journaled for rotation about a horizontal axis while the strip plate formed kneading element of said kneading rasp rotor extends in spaced relationship to the axis of rotation of said rotor and moves over the vat cylinder jacket and container bottom which is curved around the axis of rotation of said rotor is characterized primarily in that the kneading rotor comprises a rotor shaft which is located in the axis of rotation of said rotor and extends throughout its length, while on said rotor shaft there are mounted at least two crank webs axially spaced from each other and having their outer ends interconnected by a connecting element which comprises the pertaining kneading element. In view of the design according to the present invention, it is possible to select a considerably lighter construction over a kneading rotor which is cranked in a crank-like manner and lacks a central rotor shaft extending throughout its length while the kneading device according to the invention has at least the same strength as corresponding prior art kneading devices. In this way, also the kneading and mixing properties of the kneading rotor can be improved. Furthermore, the present invention makes it possible by different arrangement of the jaws to adapt the kneading rotor to the respective requirements, for instance to the properties of the material to be processed.

Figure 1:
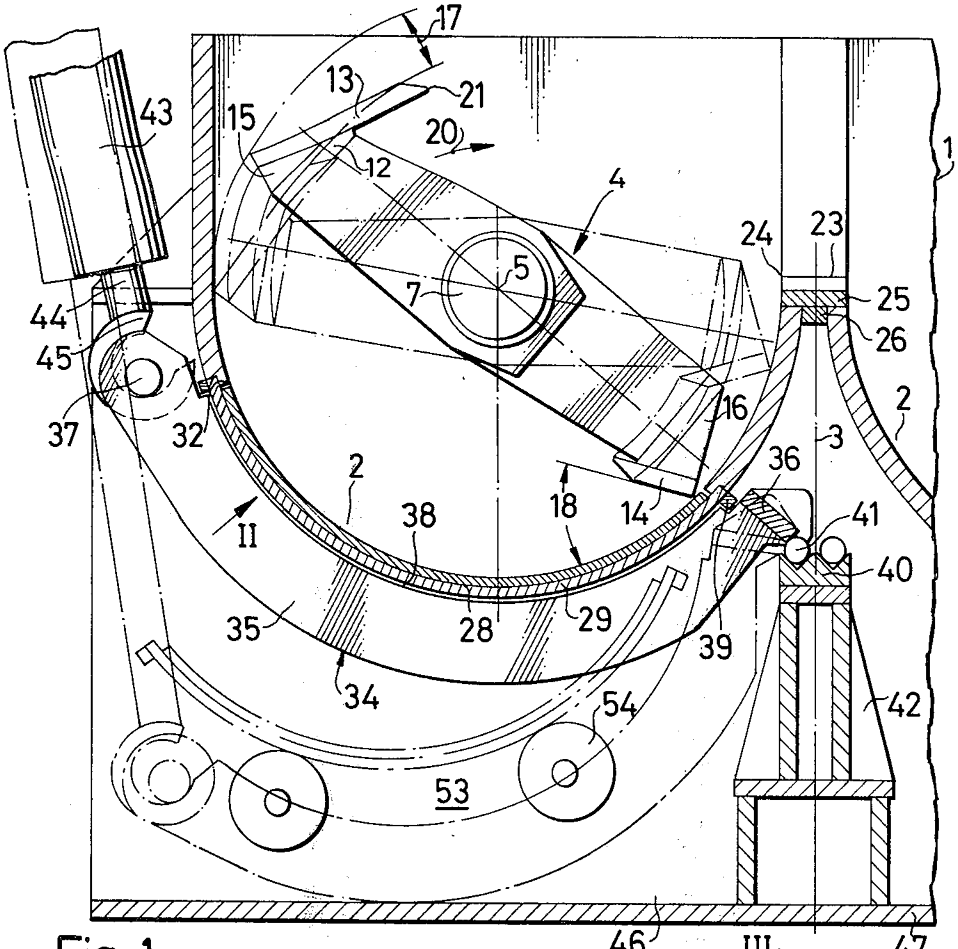
FIG. 1 is a cutout of a kneading device according to the present invention and represents a vertical section taken at a right angle to the axis of rotation of said device.
Figure 8:
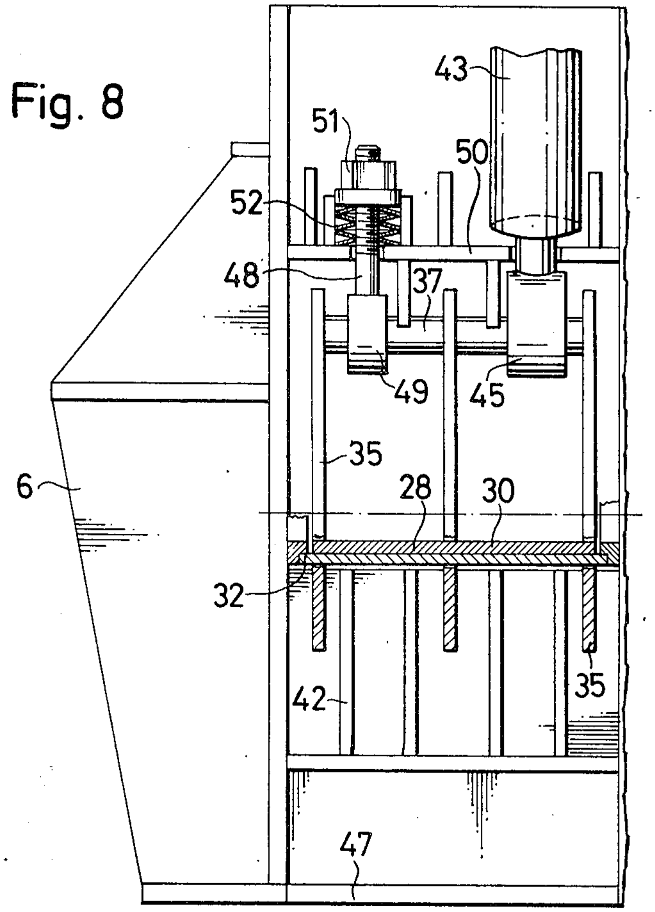
FIG. 8 is a kneading device according to FIG. 1 as seen from the lefthand side of FIG. 1.

Referring now to the drawings in detail, FIGS. 1 and 8 show a kneading device according to the invention with a vat or tank 1 which is provided with two bowl-shaped vat bottoms 2 located in an axis parallel manner with regard to each other and having a cross section which is approximately semicircular. The kneading device according to the invention has within the region of each vat bottom 2 journaled kneading rotor 4 which is rotatable about an axis of rotation 5 within a cylinder jacket or mantle and a container bottom as a reaction surface that is arranged in the axis of curvature of the respective vat bottom 2. The kneading rotors 4 are laterally journaled in bearing stands 6 laterally arranged outside the vat 1 and are so mounted that after removal of the upper bearing boxes in upward direction the kneading rotors can be taken out as a unit.

Figure 9:
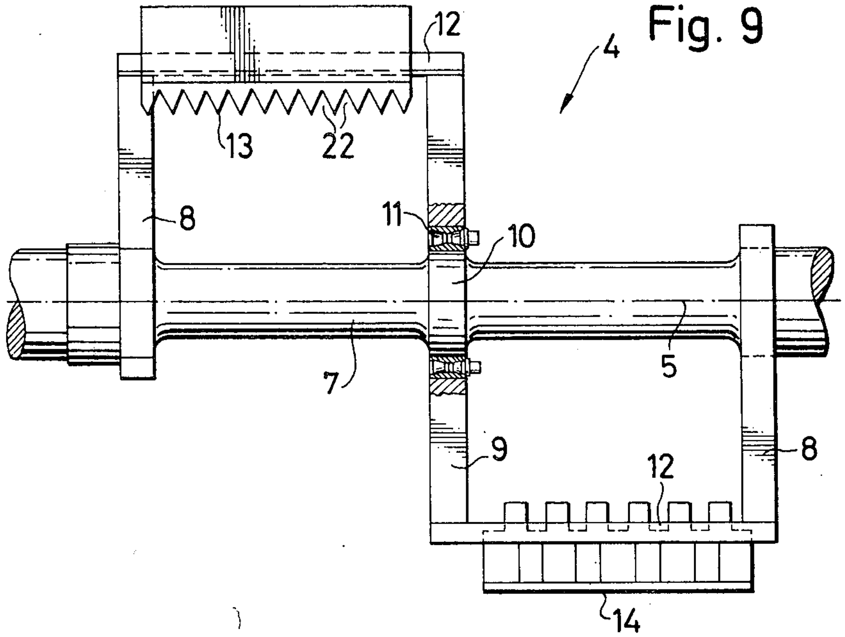
FIG. 9 shows the kneading rotor of FIG. 1 as viewed at a right angle with regard to the axis of rotation of the kneading rotor.
Figure 10:
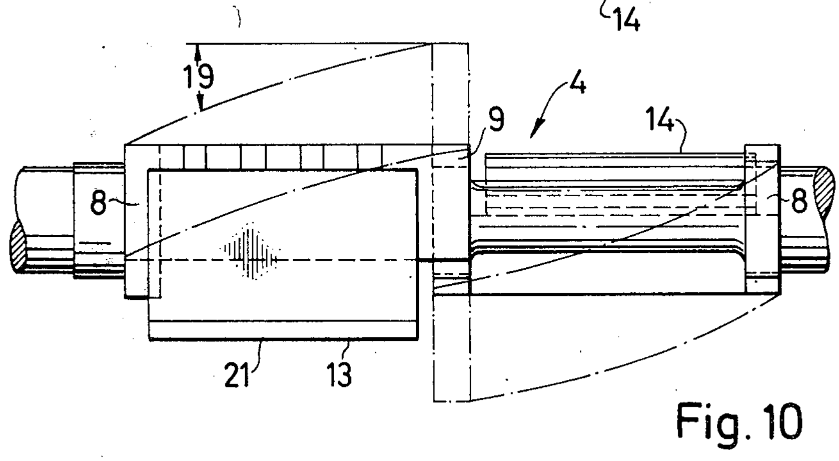
FIG. 10 is a top view of the kneading rotor according to FIG. 9.

Each kneading rotor 4, according to FIGS. 9 and 10 has a shaft 7 extending over the entire length of the kneading rotor 4. The outer ends of said shaft 7 serve for journaling the kneading rotor. Between the outer ends of said shaft 7 and uniformly spaced from each other are three crank webs 8 and 9 which are arranged as separate parts. Between the crank webs 8, 9, the rotor shaft 7 is reduced in diameter to such an extent that the crank webs 8 and 9 are arranged on sections which are widened in diameter while the central one of said sections is design as a widened collar 10. The two outer crank webs 8 are of the same design but project in a somewhat opposite direction beyond the rotor shaft 7. The intermediate crank web 9 is in contrast thereto provided with two arms in such a way that the crank web with both ends projects to the same extent as the outer crank webs 8 beyond the rotor shaft 7. The plate-shaped crank webs 8, 9, the maximum width of which is only slightly greater than the diameter of the rotor shaft 7 tapers in the direction toward their ends so that the width decreases in the direction toward said ends. The outer crank webs 8 are non-rotatably mounted on, i.e., are positively connected to the rotor shaft 7 for rotation therewith, whereas the intermediate crank web 9 is rotatable about the axis of rotation 5 on the collar 10 by means of a pivot and tensioning bearings 11 and can be arrested at any desired position of rotation relative to the rotor shaft 7. In this way, the kneading device may also belatedly be adapted to the properties of material to be processed.

The adjacent ends of the crank webs or crank arms, 8, 9, are connected to one another respectively via a connecting piece or carrier 12, which may, for example, be plate-like and which is detachably fixed to the crank arms 8, 9. On each connecting piece 12 and in fact on its outer side a strip plate formed kneading rasp member 13 or 14 in the form of a shearing member is detachably fixed so that after wear of the kneading member 13, 14 only a comparatively small constructional part need be exchanged.

As FIG. 1 shows, the plate-like or strip-like kneading member 13 or 14 respectively is fixed with a supporting wedge and fixing wedge 15 and 16 respectively on the outer upper face of the appertaining connecting piece 12 somewhat tangential to a circle having its center on the axis of rotation 5. By the choice of the wedge angle, the inclined position of the kneading member 13 and 14 and thereby its entry angle 17 and 18 respectively can be adjusted corresponding to the respective requirements. The entry angle may be, for example, as high as 90°. As the crank arm 9 is arranged to be rotatable and fixable on the rotor shaft 7, the angle of intersection of the kneading members 13, 14 and thus the angle at which these lie inclined to the direction of their working movement, can be varied as desired. In addition thereto, thus all cutting members can be adjusted.

In the embodiment shown in FIGS. 1, 9 and 10, all crank arms 8, 9 lie substantially in a common axial plane containing the axis of rotation 5 so that the connecting pieces 12 and the kneading members 13, 14 therefore, lie approximately axially parallel to the axis of rotation 5. It is, however, also possible to rotate the middle crank arm 9 relative thereto so that different connecting pieces, correspondingly designed and attached to the crank arms 8, 9 in the manner indicated in FIGS. 1, and 10, assume an angle with respect to the axis of rotation 5, whereby then also the kneading members assume a corresponding shear angle 19 as shown in FIG. 10.

Figure 6:
FIG. 6 is a cutout of FIG. 1 and shows a top view of a shearing edge.
Figure 7:
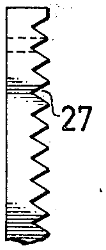
FIG. 7 shows the shearing edge of FIG. 6 as seen from the lefthand side of FIG. 6.
Figure 3:
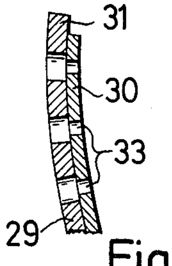
FIG. 3 represents a section taken along the line III—III of FIG. 2.
Figure 2:
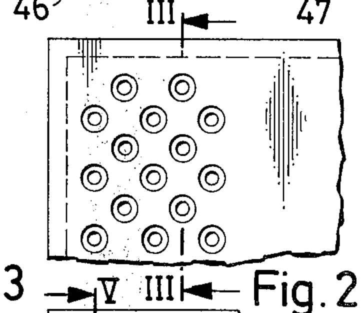
FIG. 2 is a cutout of FIG. 1 and is seen in the direction of the arrow II.

The kneading members 13, 14 the front longitudinal edges 21 of which in the direction of rotation, arrow 20, are tapered cutter-like by flattening on the outer side for protecting the kneading members 13, 14, project in the direction of rotation, arrow 20, in front of the crank arms 8, 9, and are provided on their front longitudinal edges 21 with acute angled teeth 22. As FIGS. 1 and 8 furthermore, show, the two surfaces 2 against which the kneading members 13, 14 react by virtue of the said entry angle 17 and 18 respectively, merge into one another via a yoke which lies on and is symmetrical relative to the longitudinal plate 3, and reaches slightly above the common horizontal axial plane containing the two kneading rotors axes. In this way, the path on which the material between the surfaces 2 and the kneading rotors 4 is worked, is comparatively large. On each longitudinal edge, the yoke 23 forms a shearing edge 24 parallel to the axis of rotation 5, such edge facing towards the appertaining kneading rotor. This edge forms the end of the appertaining surface 2. These edges lie on the working diameter of the kneading rotor 4. The kneading rotor 4 can, therefore, cut off particularly effectively on the shearing edge 24, the material to be worked, and feed a part to the other kneading rotor. In order after a possible bluntening of the shearing edges 24 to render possible a rapid repair, the shearing edges 24 are defined by a detachable shearing bar 25 as shown in detail in FIGS. 6 and 7, forming part of the yoke 23 and only a small wear constructional part has to be exchanged.

The shearing bar 25 is fixed on a bridge piece 26 lying between the appertaining edges of the surfaces 2 and has on the upper side teeth 27 continuous over its width which teeth form on the longitudinal edges of the shearing bar 25, the toothed shearing edges 24. Besides the shearing of the material, by means of the yoke 23, the material can be moved to and fro between the two kneading rotors 4.

Each surface 2 is partially defined by a detachable bottom part 28 which is in the form of a shell and extends approximately over an arc of 120° and lies asymmetrical to the vertical axial plane containing the axis of rotation 5, such that it terminates only a few degrees, for example, about 20°, short of the horizontal axial plane of the axis of rotation 5 on the side lying opposite to yoke 23 so that a high degree of stability is achieved.

In order to insure with simple construction a high resistance to wear of the surface 2, the detachable bottom part 28 which has the same thickness as the plates defining the remaining part of surface 2 and the vertical vat walls, consists substantially of a plate-like base member 29 of a simple material. Connected to the upper side of said base member 29, is fixed a wear sheet metal plate 30 made of a high quality material the thickness of which is smaller than that of the base member 29, for example, half as thick. The base member 29, on the upper side of which wear sheet metal plate 30 lies with its underside substantially completely flat, projects with its edges 31 slightly over the edges of the wear sheet metal plate 30 whereby the remaining part of surface 2 at the edge of the opening in which the bottom part 28 is located, has on the outside correspondingly recessed shoulders 32 in which the edges 31 of the base member 29 positively engages. The wear sheet metal plate 30 fits closely in the gap in the inner face of the surface 2. The surface of plate 30 is then accurately aligned in respect of the remaining parts of surface 2. The shell formed by plates 29 and 30 lies substantially accurately on the working diameter of the kneading rotor 4.

The wear sheet metal plate 30 may be designed as a sieve plate provided with perforations 33 or may be designed as a non-perforated sheet metal plate so that an easy emptying of the cavity or vat 1 through the opening on the underside of the cavity 1 closed by this bottom part 28 may be possible. In addition thereto, by exchanging the respective bottom part 28, a bottom part 28 adapted to the material to be worked may be inserted. In the first case, the base body 29 is provided with perforations or designed as a screen plate while its perforations are larger than those of the closure sheet metal plate 30 and, for example, the holes of the base member 29 lie coaxially with those of the wear sheet metal plate 30 so that an unobstructed passage of the material to be worked is insured. It is, however, also possible for the base member 29, when the wear sheet metal plate is designed unperforated, to be designed as a sieve or screen.

Figure 5:
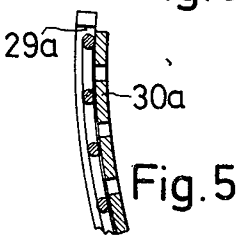
FIG. 5 illustrates a section taken along the line V—V of FIG. 4.
Figure 4:
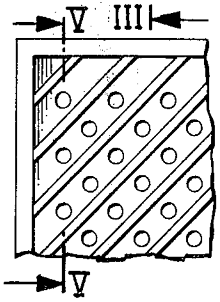
FIG. 4 shows an additional embodiment of a detachable bottom portion and represents a view of the top side of said bottom part.

In the modification shown in FIGS. 4 and 5, the basic member 29*a* is designed as a grating on which the wear sheet metal plate 30*a* is fixed. The detachable bottom part 28 is, for simple handling, held with a supporting rocker 34 located on its underside. For achieving a high degree of stability with small space requirements, rocker 34 is formed by three crosswise connecting members 36, 37 lying at equal distances next to one another connecting around the axis of rotation 5 accurate equal rocker check plates 35 and their ends while the upper narrow edges 38 of the check plates 35, at right angles to the axis of rotation 5, form supporting faces for the detachable bottom part 28. The supporting rocker 34 is curved in a space saving manner corresponding to the member 28 whereby it is also possible for the detachable bottom part 28 to lie securely over a large surface on the upper side of the supporting rocker 34. Since, in the direction of the axis of rotation, two detachable bottom parts 28 and two supporting rockers 34 are provided which are preferably of equal lengths, many possibilities of variation can be obtained whereby in addition, in the longitudinal direction of the surface 2, adjacent to one another, differently formed bottom parts 28 can be arranged. Perforated and non-perforated bottom parts may, for example, be arranged as desired. In this way it is possible to provide different working zones inside the kneading apparatus. Such working zones may be for the prior backing up and for the mixing in the zones of the non-perforated plates and working zones for the kneading and homogenizing in the zones of the perforated plates. The zone of the non-perforated plates may be provided either under a single kneading rotor 4 or in two opposite sections or halves of two adjacent surfaces 2; furthermore, it is possible to provide nonperforated or perforated plates in any desired arrangement crosswise or diagonally on two adjacent surfaces 2. At the ends of the rocker check plates 35, the supporting faces 38 have recesses for the engaging of edge bridge pieces 39 which are provided on the longitudinal edges of the base member 29 and on its outside, and by means of which a rotation of the bottom part 28 in relation to the supporting rocker 34 can take place. For achieving a light construction and so that the material can easily fall down due to the supporting rocker, the supporting rocker 34 has passage openings over the whole length and width of the detachable bottom part 28.

With the longitudinal side below the yoke 23, the supporting rocker 34 is mounted in a prism-like bearing 40 which is open at the top and lies directly adjacent to the longitudinal middle plane 3 and above the lowest point of the surface 2 so that after the lowering of the supporting rocker 34, the detachable bottom part 28 is especially well accessible. The supporting rocker 34 engages in the bearing 40 with an axial pin 41 provided on its underside in such a way that it can be removed upwardly from the bearing 40. Expediently, at both ends of the supporting rocker 34, there is provided a bearing 40 in which the supporting rocker 34 engages with an axial pin 41 provided on the appropriate end. In this way, the detachable bottom part 28 with the supporting rocker 34 can be withdrawn from below said vat or cavity. For adjacent supporting rockers 34 of adjacent surfaces 2, the bearing 40 has respectively two receiving prisms lying symmetrically on both sides of the longitudinal middle plane 3 whereby this bearing 40 is disposed on a bracket 42 of the frame 46 of the kneading apparatus.

The longitudinal side of the supporting rocker 34 extending approximately over the same arc angle opposite the bearing 40 as the detachable bottom part 28, is engaged by a hydraulic working cylinder 43 by means of a piston rod 44 while the piston rod 44 via an open ring 45 engages from below the appropriate crosswise connecting member 37. Member 37 is formed by an axial rod pushed through bores of the rocker check plates 35. The ring 45, which on its side facing towards the cavity is open over a width corresponding to the crosswise connecting member 37, lies between two rocker check plates 35 and can be released from the supporting rocker 34 by the construction described so that the supporting rocker 34 can in its entirety be withdrawn below the cavity. With the working cylinder 43 located above the supporting rocker 34, the supporting rocker 34 can be lowered downwards around the axle of the bearing 40 into the position indicated in dot and dash lines in FIG. 1 in which the supporting rocker 34 lies on the bottom or a base plate 47. The supporting rockers 34 can then be removed from the bearing 40.

Additionally, or instead, there is rotatably mounted adjacent the working cylinders 43 between the two other rocker check plates 35 on the crosswise connecting member 37, an eye screw 48 with a bearing eye 49 with which there is associated a horizontal cross piece plate 50 on the outside of the cavity, such that by pivoting around the longitudinal axis of the crosswise connecting member 37, it can be removed from the cavity through the slot and can be lowered downwards with the supporting rocker 34 in the manner described. Between a nut 51 placed on the eye screw 48 above the cross piece plate 50, and the cross piece plate 50, a dish spring pack 52 may also be selectively arranged, by means of which the supporting rocker 34 is spring loaded in upward direction so that the bottom part can be deflected slightly resiliently against the kneading pressure. Instead, however, it is also possible to provide hydraulic shock absorbers or dampers while these hydraulic dampers may also be so designed that by means thereof the hydraulic lowering and raising of the detachable bottom part 28 and of the supporting rocker 34 can be effected.

In FIG. 8 there is shown only one half of the length of the kneading apparatus. Expediently, each half of each surface 2 has a separate detachable bottom part 28 and a separate supporting rocker 34 so that the cavity bottom can be shaped differently over its length.

In order to render possible a simple transport of the detachable bottom part 28 and/or of the supporting rocker 34, there may below the supporting rocker 34 occupying its working position be provided an additional supporting device 53 not shown in detail in FIG. 1. Device 53 has, for example, supporting members 54 formed by rollers, which upon lowering the supporting rocker 34, extend upwards between the rocker check plates 35 so that the detachable bottom part 28 rests thereon in the manner indicated in dot and dash lines in FIG. 1, and upon further lowering of the supporting rockers 34, disengages the latter. The supporting members 54 may, for example, be provided on a slide, carriage, a flap or the like to be deposited on the base plate so that the bottom part 28 and if necessary also the supporting rocker 34 can be removed from under the cavity or vat 1.

Figure 11:
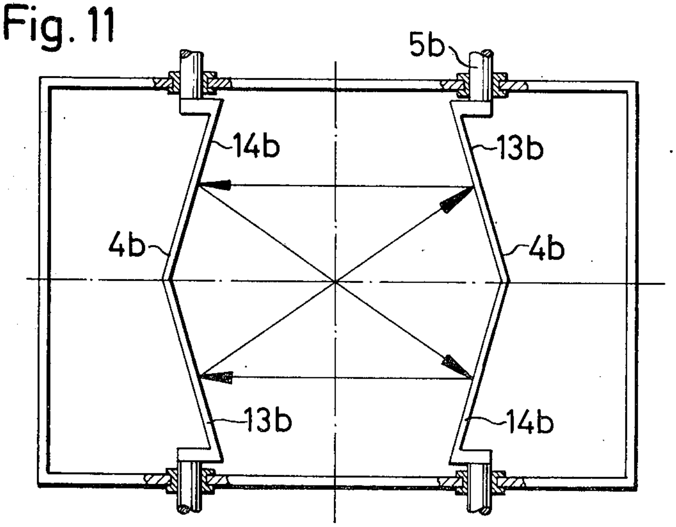
FIG. 11 shows in top view still another embodiment of the kneading device according to the invention.

In the embodiment shown in FIG. 11, the two kneading rotors 4*b* do not, as in the embodiment of FIGS. 9 and 10, have continuous rotor shafts but have end shaft pins, which are connected to one another only via the kneading members 13*b*, 14*b*. The two kneading members 13*b*, 14*b* of each kneading rotor 4*b* lie at an obtuse angle to one another such that each kneading member 13*b* and 14*b* respectively crosses approximately in the middle of its length the axis of rotation 5*b*. If the two kneading rotors 4*b*, are rotated, the material to be worked will be moved to and fro diagonally and at right angles. The arrangement of the kneading members according to FIG. 11 described may, however, also be provided in a design of the kneading rotor according to FIGS. 9 and 10 so that the oblique angle of the kneading members can be varied corresponding to requirements. The kneading rotors may be driven through the intervention of single, synchronous and/or coupling drives while they may be rotated at variable speeds as desired and preferably may be drivingly so connected that they can assume any desired relative angle position in respect of one another. Furthermore, it is advantageous if the kneading rotors can be driven at the same speed as well as also at different speed so that a minimizing of the specific force requirement adapted to the respective material to be treated is possible.

Due to the design as described, the kneading apparatus has a high passage output. Furthermore, the parts and the working tools of the kneading apparatus can be selected for sensitivity to wear and/or for the respective material to be processed and are easily exchanged without a complete emptying of the apparatus being necessary. Due to the variability of the working tools, for example, of the kneading rotors, due to the variability of the possible sieve holes or screen mesh and sieve arrangements and arrangements of the non-perforated plates as well as due to the variability of the kneading members designed, for example, as cutting bars, the kneading apparatus can be adapted in many ways to the respective requirements. The kneading apparatus is finally very insensitive to the material to be treated in particular in respect of different moisture, different material consistency and in respect of different hardness. Due to these advantages with the most different materials, the most different mixing and homogenizing effects can be achieved.

It is, of course, to be understood that the present invention is, by no means, limited to the specific showing in the drawings but also comprises any modifications within the scope of the appended claims.

What is claimed is:

1. An apparatus for continuous treating of a mass of clay-like material simultaneously discharged uniformly comprising in combination: a frame, rotor means rotatable in said frame on a substantially horizontal axis and comprising at least one strip-plate formed kneading rasp member located approximately parallel to said axis as offset radially from said axis, a cylinder jacket and a container bottom having a perforated shell with a reaction surface toward said axis located essentially accurately with respect to said rotor means and said frame including therewith said container bottom as a reaction member beneath said rotor means and substantially concentric with the said axis and providing the reaction surface for cooperation directly with said kneading member, said reaction member including said perforated shell through which material is forced under pressure directly by said kneading member which forms an inclined entry angle with the reaction surface of said bottom having the perforated shell for continuous passage of the material.

2. An apparatus in combination according to claim 1 in which at least one kneading member support arm is adjustable on said shaft about said axis.

3. An apparatus in combination according to claim 2 in which each kneading member comprises a carrier connected to the respective support arm, and at least one kneading member including a toothed element mounted on the respective carrier.

4. An apparatus in combination according to claim 1 in which the leading edge of said kneading member tapers inwardly in the forward direction.

5. An apparatus in combination according to claim 1 which includes a pair of said rotors in horizontally spaced parallel relation and each having a said kneading member, a reaction member having a said reaction surface for each kneading member, said surfaces merging in a yoke located between the axis of rotation of said rotors.

6. An apparatus in combination according to claim 5 in which said yoke is in about the horizontal plane of the axes of rotation of said rotors and has a toothed upper edge thereon.

7. An apparatus in combination according to claim 6 in which the toothed upper edge of said yoke comprises teeth extending laterally thereacross and at the ends forming the terminal ends of the said reaction surfaces.

8. An apparatus in combination according to claim 6 in which the upper edge of said yoke comprises a separate toothed shearing bar, each reaction member including a detachable shell forming a circumferential portion thereof.

9. An apparatus in combination according to claim 8 in which each said shell extends over an arc of about 120°.

10. An apparatus in combination according to claim 8 in which each said shell comprises a wear plate on the rotor side and a base plate supporting the wear plate, smaller perforations in said wear plate, and larger perforations in said base plate registering with said smaller perforations.

11. An apparatus in combination according to claim 10 in which the side edges of said base plate protrude beyond the side edges of the wear plate, and notches formed in said reaction member to engage the protruding side edges of said base plate.

12. An apparatus in combination according to claim 11 which includes pivot means parallel to said axis at one axial edge of each base plate for supporting the respective shell for pivotal movement.

13. An apparatus in combination according to claim 12 which includes rocker means having one end engaging said pivot means and extending circumferentially beneath the respective said shell of the adjacent reaction member.

14. An apparatus in combination according to claim 13 in which each said shell is interlocked with the respective rocker against movement about the axis of the respective rotor.

15. An apparatus in combination according to claim 13 in which said rocker means comprises plate elements spaced in the axial direction and axial elements interconnecting said plate elements.

16. An apparatus in combination according to claim 13 which includes axial rod means at the other end of said rocker means, a lift device at the other end of said rocker means, and a hook on said lift device for engagement with said rod means.

17. An apparatus in combination according to claim 15 which includes axial rod means at the other end of said rocker means, and spring means acting on said shell via said rod means to bias said shell toward said rotor.

18. An apparatus in combination according to claim 13 which includes further support elements in said frame adapted supportingly to engage said shell when said rocker means is lowered.

19. An apparatus in combination according to claim 12 which includes a pair of said shells for each rotor, said shells being in side by side relation and a supporting rocker means for each said shell.

* * * * *